(12) United States Patent
Lee et al.

(10) Patent No.: US 9,755,999 B2
(45) Date of Patent: Sep. 5, 2017

(54) METHOD AND APPARATUS FOR CHANGING FONT SIZE OF MESSAGE IN A MOBILE COMMUNICATION TERMINAL

(71) Applicant: Samsung Electronics Co., Ltd., Gyeonggi-do (KR)

(72) Inventors: Ki-Tae Lee, Seoul (KR); Soo-Ryeol Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 303 days.

(21) Appl. No.: 14/703,280

(22) Filed: May 4, 2015

(65) Prior Publication Data
US 2015/0236988 A1   Aug. 20, 2015

Related U.S. Application Data

(63) Continuation of application No. 11/481,528, filed on Jul. 6, 2006, now Pat. No. 9,026,154.

(30) Foreign Application Priority Data

Jul. 6, 2005 (KR) .................. 10-2005-0060518

(51) Int. Cl.
*H04L 12/58* (2006.01)
*G06F 3/048* (2013.01)
*G06F 3/0484* (2013.01)

(52) U.S. Cl.
CPC ............ *H04L 51/04* (2013.01); *G06F 3/0484* (2013.01)

(58) Field of Classification Search
CPC .............................. G06F 3/0484; H04L 51/04
See application file for complete search history.

(56) References Cited

U.S. PATENT DOCUMENTS 5,754,873 A     5/1998  Nolan
6,288,702 B1 *  9/2001  Tachibana ............ G06F 3/0481
                                                  345/671
(Continued)

FOREIGN PATENT DOCUMENTS

EP    0 883 056    12/1998
GB    2 290 898     1/1996
(Continued)

OTHER PUBLICATIONS

European Search Report dated Nov. 13, 2015 issued in counterpart Appln. No. 06014068.8-1972, 5 pages.
(Continued)

*Primary Examiner* — Ariel Balaoing
(74) *Attorney, Agent, or Firm* — The Farrell Law Firm, P.C.

(57) ABSTRACT

Methods and apparatuses are provided that is performed by an electronic device. A display screen provides a first user interface to receive a first user input and to display user inputted content including a first representation of the first user input. An instruction to provide a second user interface is received. The display screen provides the second user interface together with the first user interface in response to the received instruction. A portion of the user inputted content is displayable in the second user interface in an enlarged size. A second user input is received via the second user interface. In response to the second user input, a second representation of the second user input is displayed in the second user interface. The user inputted content displayed in the first user interface is updated by adding the second representation in a displayed size smaller than a size used for displaying the second representation in the second user interface.

20 Claims, 6 Drawing Sheets

(56) References Cited

U.S. PATENT DOCUMENTS

| | | |
|---|---|---|
| 2001/0013875 A1* | 8/2001 | Soohoo ............... G06F 3/018 345/671 |
| 2002/0124026 A1 | 9/2002 | Weber |
| 2002/0188637 A1 | 12/2002 | Bailey et al. |
| 2004/0109020 A1 | 6/2004 | Song |
| 2005/0039137 A1* | 2/2005 | Bellwood ............ G06F 3/0482 715/801 |
| 2005/0093826 A1 | 5/2005 | Huh |
| 2005/0108661 A1 | 5/2005 | Deeds |
| 2006/0041629 A1 | 2/2006 | Lira |
| 2006/0227153 A1 | 10/2006 | Anwar et al. |

FOREIGN PATENT DOCUMENTS

| | | |
|---|---|---|
| JP | 61211767 | 9/1986 |
| JP | 5143052 | 6/1993 |
| JP | 9073290 | 3/1997 |
| JP | 10105362 | 4/1998 |
| JP | 11085133 | 3/1999 |
| JP | 11143453 | 5/1999 |
| JP | 2001013945 | 1/2001 |
| JP | 2001312397 | 11/2001 |
| JP | 2003169125 | 6/2003 |
| JP | 2004185370 | 7/2004 |
| KR | 10-2003-0002532 | 1/2003 |
| KR | 10-2004-0049487 | 6/2004 |
| KR | 10-2004-0092797 | 11/2004 |
| KR | 10-2005-0002469 | 1/2005 |
| KR | 10-2005-0015897 | 2/2005 |
| RU | 2 267 151 | 3/2004 |
| WO | WO 02/082287 | 10/2002 |
| WO | WO 2004/109020 | 12/2004 |

OTHER PUBLICATIONS

Sony Ericsson P910i User Guide, Dec. 2004.
Russian Office Action dated Mar. 24, 2009 issued in counterpart Appln. No. 2008104419/09.

* cited by examiner

METHOD AND APPARATUS FOR CHANGING FONT SIZE OF MESSAGE IN A MOBILE COMMUNICATION TERMINAL

PRIORITY

This application is a Continuation Application of U.S. application Ser. No. 11/481,528, filed on Jul. 6, 2006, which claims priority under 35 U.S.C. §119 to an application entitled "Method of Changing Font Size of Message in a Mobile Communication Terminal" filed in the Korean Intellectual Property Office on Jul. 6, 2005 and assigned Ser. No. 10-2005-10 0060518, the contents of which are incorporated herein by reference.

BACKGROUND OF THE INVENTION

1. Field of the Invention

The present invention relates generally to a method and an apparatus for changing the font size of a message in a mobile communication terminal, and in particular, to a method and apparatus for enlarging the text of a message so that the message is easy to view during writing an outgoing message or reading an incoming message in a mobile communication terminal.

2. Description of the Related Art

Due to the widespread use of mobile communication terminals, service providers and terminal manufacturers have been developing more convenient, special features to attract more users. For example, mobile communication terminals now are equipped with the functions of a phonebook, games, a scheduler, a Short Message Service (SMS), Internet, e-mail, morning or wake-up calls, an MPEG Layer 3 (MP3) player, and a digital camera.

One of the most popular functions is SMS. Recently, SMS has gained popularity over voice calls, especially among teenagers. Besides SMS, multimedia messages are available, including pictures, ring tones, video clips, and the like. Hence, the market for the mobile communication terminal has been further growing rapidly.

In most countries, the SMS message is limited to some bytes (16 bytes in Korea) of text to each line, equivalent to some English characters (16 bytes in Korea), and a font size is limited also, to spare space for emoticons.

Because of the limited display size and the limited font size, vision impaired people have difficulty in reading a message during writing an outgoing message or reading an incoming message. When the font size is changed randomly, it in turn changes the layout of emoticons, disfiguring the emoticons. Hence, the font size is limited.

SUMMARY OF THE INVENTION

An object of the present invention is to substantially solve at least the above problems and/or disadvantages and to provide at least the advantages below. Accordingly, an object of the present invention is to provide a method of enabling a user to easily read a message by changing the font size of the message in a mobile communication system.

According to one aspect of the present invention, a method is provided that is performed by an electronic device. A display screen provides a first user interface to receive a first user input and to display user inputted content including a first representation of the first user input. An instruction to provide a second user interface is received. The display screen provides the second user interface together with the first user interface in response to the received instruction. A portion of the user inputted content is displayable in the second user interface in an enlarged size. A second user input is received via the second user interface. In response to the second user input, a second representation of the second user input is displayed in the second user interface. The user inputted content displayed in the first user interface is updated by adding the second representation in a displayed size smaller than a size used for displaying the second representation in the second user interface.

According to another aspect of the present invention, an apparatus is provided that includes a display and a processor. The processor is configured to provide, via a display screen of the display, a first user interface to receive a first user input and to display user inputted content including a first representation of the first user input. The processor is also configured to receive an instruction to provide a second user interface. Additionally, the processor is configured to provide, via the display screen of the display, the second user interface together with the first user interface in response to received instruction, a portion of the user inputted content being displayable in the second user interface in an enlarged size. The processor is further configured to receive, via the second user interface, a second user input, and, in response to the second user input, display a second representation of the second user input in the second user interface. The processor is also configured to update the user inputted content displayed in the first user interface by adding the second representation in a displayed size smaller than a size used for displaying the second representation in the second user interface.

According to another aspect of the present invention, an apparatus is provided that includes a display and a processor. The processor is configured to display content in a first area of the display, and receive an instruction to display an input interface. The processor is also configured to provide the input interface in a second area of the display in response to the received instruction, and receive input via the input interface. Additionally, the processor is configured to, in response to the input, display, via the input interface, a first representation corresponding to the input in a first size larger than a second size used for displaying the content. Further, the processor is configured to display a second representation corresponding to at least a portion of the first representation in the first area in relation to the content.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EMBODIMENTS OF THE PRESENT INVENTION

Preferred embodiments of the present invention will be described herein below with reference to the accompanying drawings. In the following description, well-known functions or constructions are not described in detail since they would obscure the invention in unnecessary detail.

The present invention provides a technique for increasing the readability of a message by changing the font size of the message during writing or reading a message. The message includes an SMS message, e-mail, a Multimedia Message System (MMS) message, and an Enhanced Message Service (EMS) message.

Figure 1:
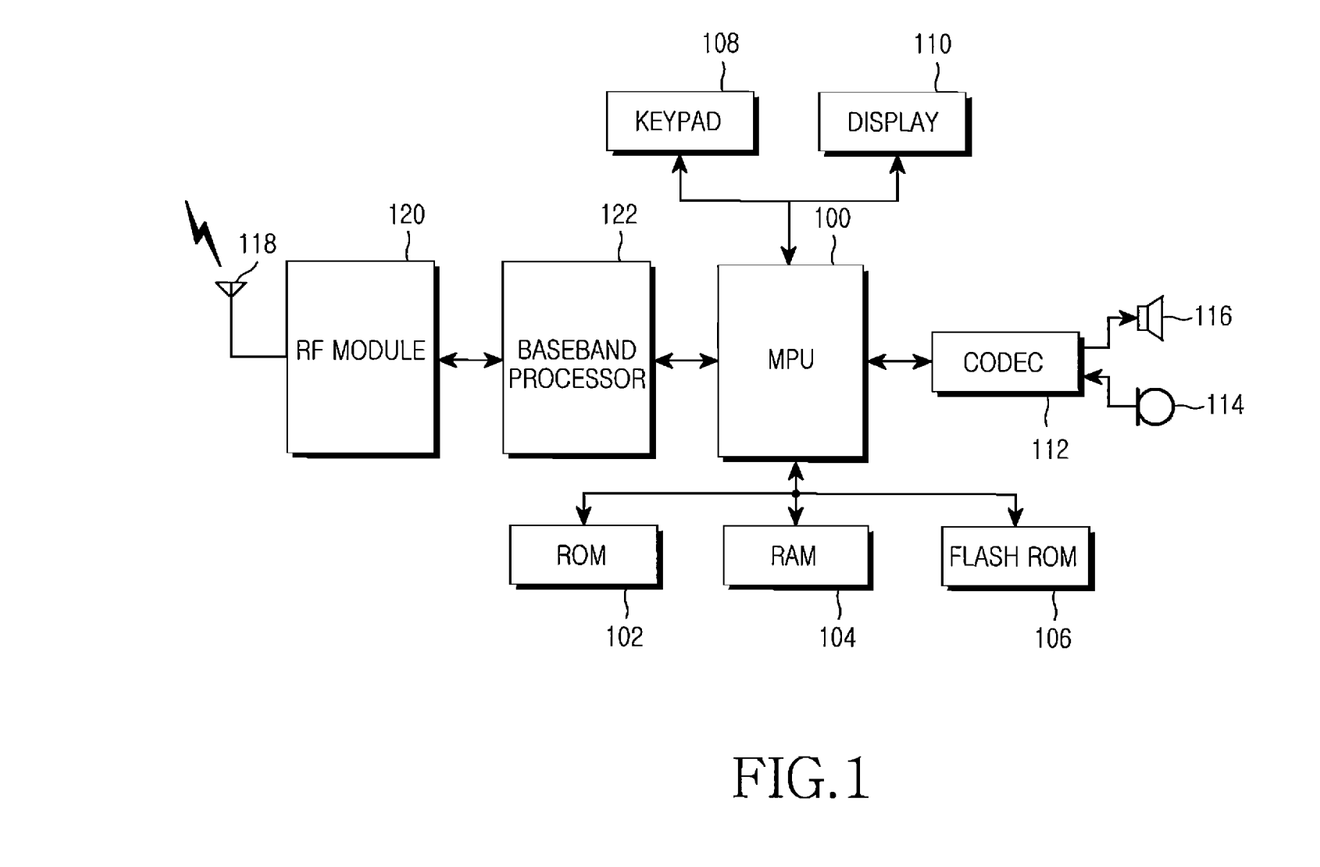
FIG. 1 is a block diagram of a mobile communication terminal according to the present invention.

FIG. 1 is a block diagram of a mobile communication terminal according to the present invention. The mobile communication terminal can include, but is not limited to, any of a cellular phone, a Personal Communication System (PCS) terminal, a Personal Data Assistant (PDA), and an International Mobile Telecommunication 2000 (IMT 2000) terminal. The following description is made in the context of a typical configuration of the mobile communication terminal.

Referring to FIG. 1, a Micro-Processor Unit (MPU), acting as a controller, 100 provides overall control to the mobile communication terminal. Specifically, it processes and controls voice and data communications. In addition to the typical functions, the MPU 100 controls change of the font size for a message by use of a pop-up window or a magnifier window. The typical processing and control operation of the MPU 100 will not be described herein. In the description below, one page is defined as the entire text viewed at one time on a screen.

A Read Only Memory (ROM) 102 stores the microcodes of programs used for processing and control of the MPU 100, and reference data. Particularly, it stores a program for displaying a message in an increased font size in a pop-up window or a magnifier window according to the present invention. A Random Access Memory (RAM) 104 serves as a working memory for the MPU 100, for temporarily storing data generated during execution of each program. A flash ROM 106 stores updatable data to be kept, such as a phonebook and outgoing and incoming messages.

A keypad 108 is provided with alphanumeric keys, and function keys including Menu, Cancel (Clear), Talk, End, OK, Internet, and navigation (or directional) keys (▲/▼/◄ /►). It provides key input data corresponding to a user-pressed key to the MPU 100. A display, sometimes referred as a display means, 110 displays status information created during the operation of the mobile communication terminal, a limited number of characters, moving pictures, and still images. The display 110 may be comprised of a Liquid Crystal Display (LCD).

A Coder-Decoder (CODEC) 112 connected to the MPU 100, and a speaker 116 and a microphone 114 which are connected to the CODEC 112 collectively form a voice input/output block for voice call and voice recording. The CODEC 112 converts Pulse Code Modulation (PCM) data received from the MPU 100 to an analog voice signal and outputs the analog voice signal through the speaker 116. Also, it converts a voice signal received through the microphone 114 to PCM data and provides the PCM data to the MPU 100.

A Radio Frequency (RF) module 120 downconverts an RF signal received through an antenna 118 to a baseband signal and provides the baseband signal to a baseband processor 122. It also upconverts a baseband signal received from the baseband processor 122 to an RF signal and sends the RF signal through the antenna 118. The baseband processor 122 processes a baseband signal transmitted/received between the RF unit 120 and the MPU 100. For example, the baseband processor 122 channel-encodes and spreads data during transmission and despreads and channel-decodes a signal during reception.

Also, an apparatus for enlarging a message in a mobile communication system may comprise a controller for monitoring selection of a font size change menu during message writing, outputting an enlarged entry window for entering a message with an enlarged font, if the font size change menu is selected, and a display means for displaying font size change menu and the enlarged entry window. Here, the enlarged entry window is a pop-up window.

Also, an apparatus for enlarging a message in a mobile communication system may comprise a controller for monitoring selection of a font size change menu during message reading, selecting a part of the message to be enlarged, if the font size change menu is selected, and outputting the selected message part with an enlarged font size in one of a pop-up window and a magnifier window, and a displaying means for displaying the font size change menu and one of the pop-up window and the magnifier window.

Also, an apparatus for changing a font size of a message in a mobile communication system may comprise a controller for selecting a font size change menu, outputting a font size changing window, and entering a message with a changed font size in the font size changing window, and a displaying means for displaying the font size change menu and the font size changing window. Here, the font size change window is a pop-up window.

Also, an apparatus for changing a font size of a message in a mobile communication system may comprise a controller for selecting a font size change menu during reading a message, selecting a part of the message to be changed in a font size and changing the font size of the selected message part in a window, and a displaying means for displaying the font size change menu and the window.

Figure 2:
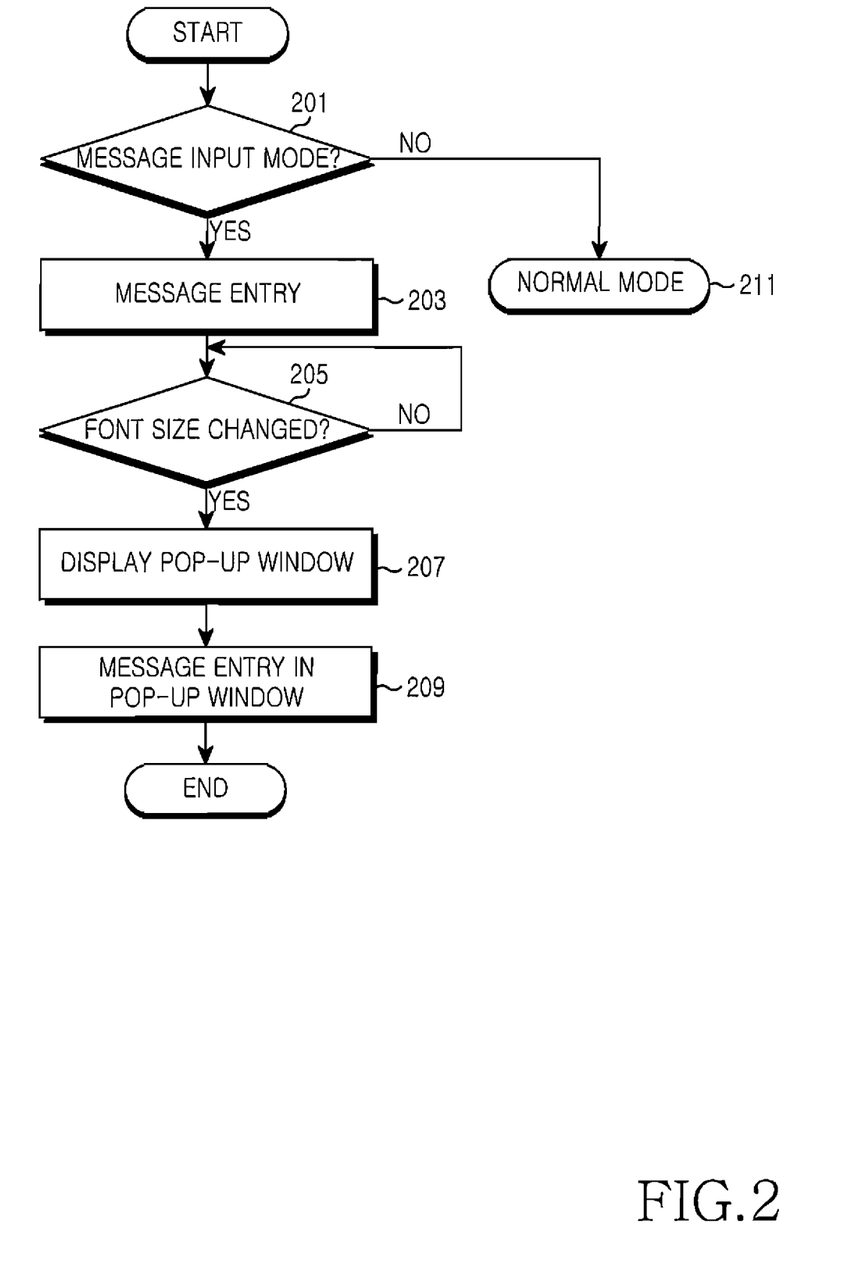
FIG. 2 is a flowchart illustrating an operation for writing an outgoing message in an enlarged view according to the present invention.

FIG. 2 is a flowchart illustrating an operation for writing a message in an increased font size according to the present invention, and FIGS. 3A, 3B and 3C are screen displays sequentially illustrating the message writing in an increased font size in a pop-up window.

Referring to FIG. 2, the MPU 100 monitors selection of a message input mode by key input from the user in step 201. If the message input mode is not selected, the MPU 100 performs a normal mode operation (e.g. idle mode) in step 211.

Figure 3:
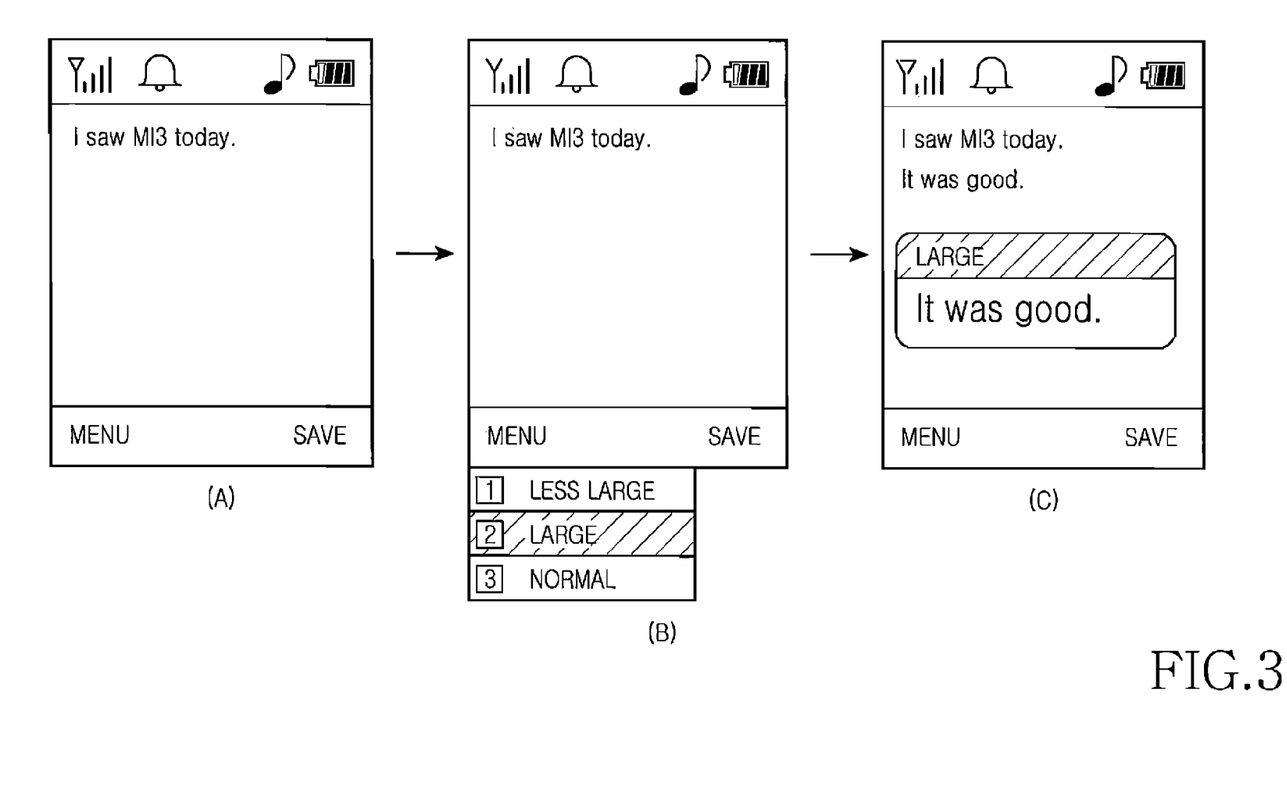
FIG. 3 is screen displays sequentially illustrating message writing in an increased font size according to the present invention.

Upon selection of the message input mode, the MPU 100 receives text for a message in step 203, as illustrated in screen (A) of FIG. 3. During the message writing, the MPU 100 monitors selection of a font size change menu item (e.g. less large or large) by user-key manipulation in step 205, as illustrated in screen (B) FIG. 3.

Upon selection of the font size change menu item, the MPU 100 displays a pop-up window for message entry in an increased font size in step 207, as illustrated in screen (C) of FIG. 3, and continuously displays the entered message in the pop-up window in step 209. The pop-up window is displayed over an original message entry window illustrated in screen (A) of FIG. 3. For example, if the user enters "I saw MI3 today" in the pop-up window, it is also displayed on the underlying original message entry window.

After the message is completely written, the MPU 100 ends the algorithm.

In the above embodiment for enlarged message entry, two font size change menu items are available, for example, "less large" and "large", as illustrated in screen (B) of FIG. 3. If "less large" is selected, the pop-up window for enlarged message entry is displayed and each character is enlarged, for example, 1.5 times the normal font size (16 bytes per line equivalent to 16 English characters), as illustrated in screen (C) of FIG. 3.

If "large" is selected, the same operation is performed, except that each character is enlarged, for example, twice the normal font size.

Figure 4:
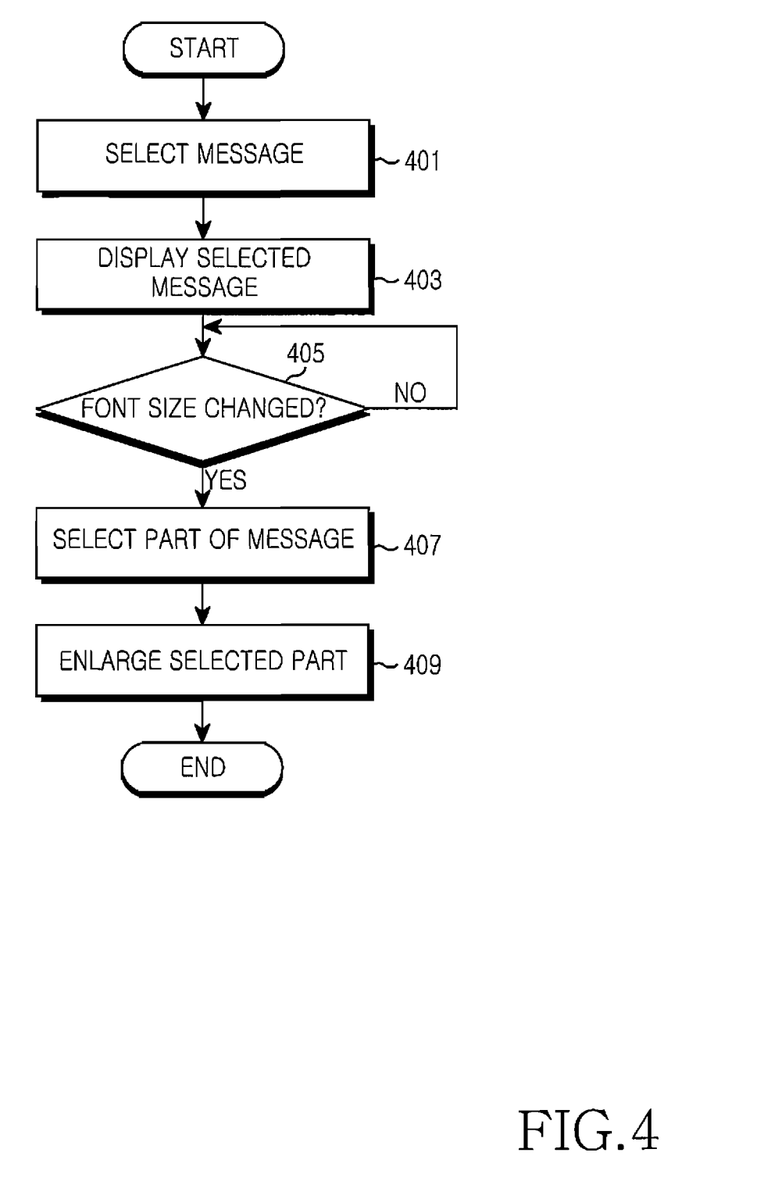
FIG. 4 is a flowchart illustrating a procedure for reading an incoming message in an increased font size according to the present invention.

FIG. 4 is a flowchart illustrating a procedure for reading a message in an increased font size according to the present invention.

Referring to FIG. 4, upon user-selection of an incoming message by key manipulation in step 401, the MPU 100 displays the selected message on the display 110 in step 403.

In step 405, the MPU 100 monitors selection of a font size change menu item (e.g. 1. magnifier, 2. large view).

Upon selection of a font size change menu item, the MPU 100 selects all or part of the displayed message to be enlarged according to user-key manipulation in step 407 and enlarges the selected part in a pop-up window or a magnifier window on the display 110 in step 409.

Figure 5:
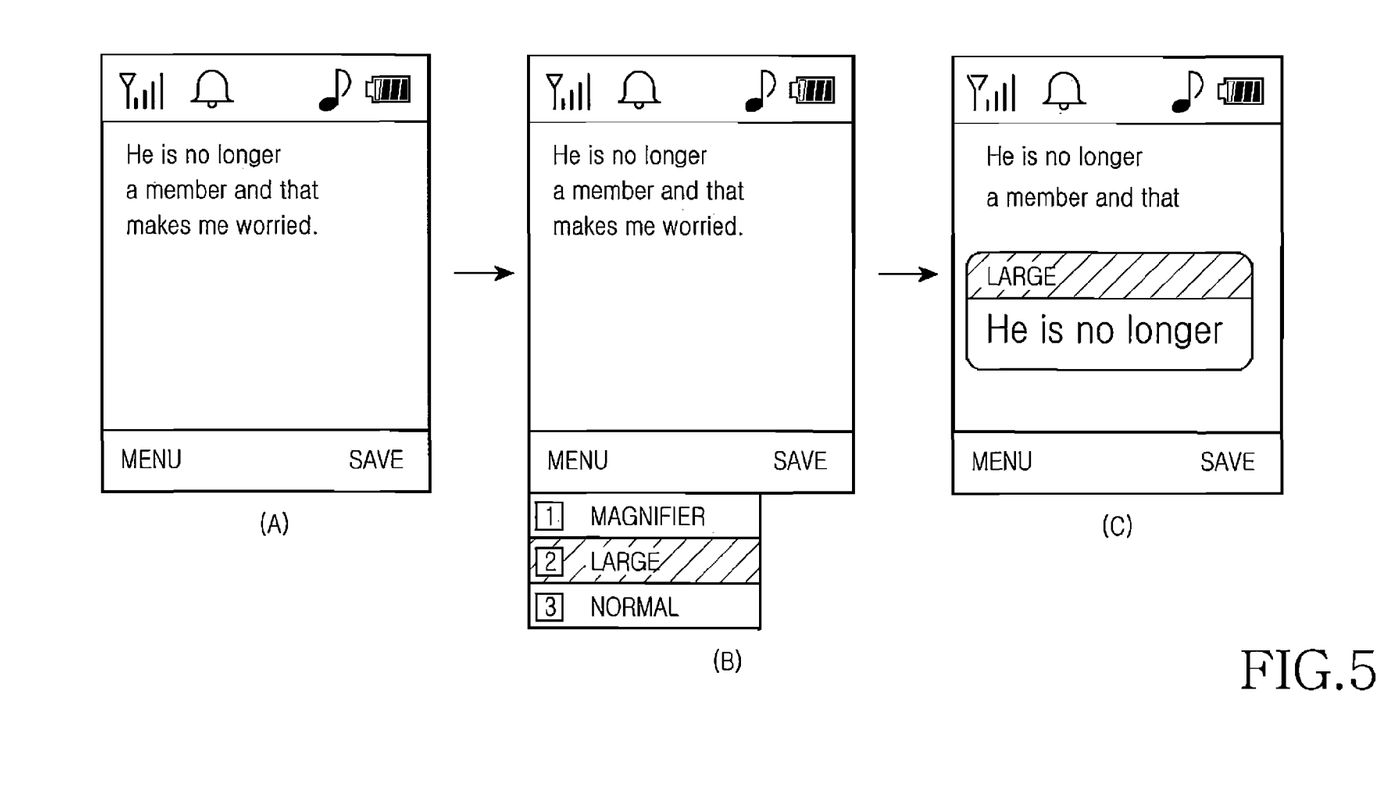
FIG. 5 is screen displays sequentially illustrating message reading in an increased font size according to the present invention.
Figure 6:
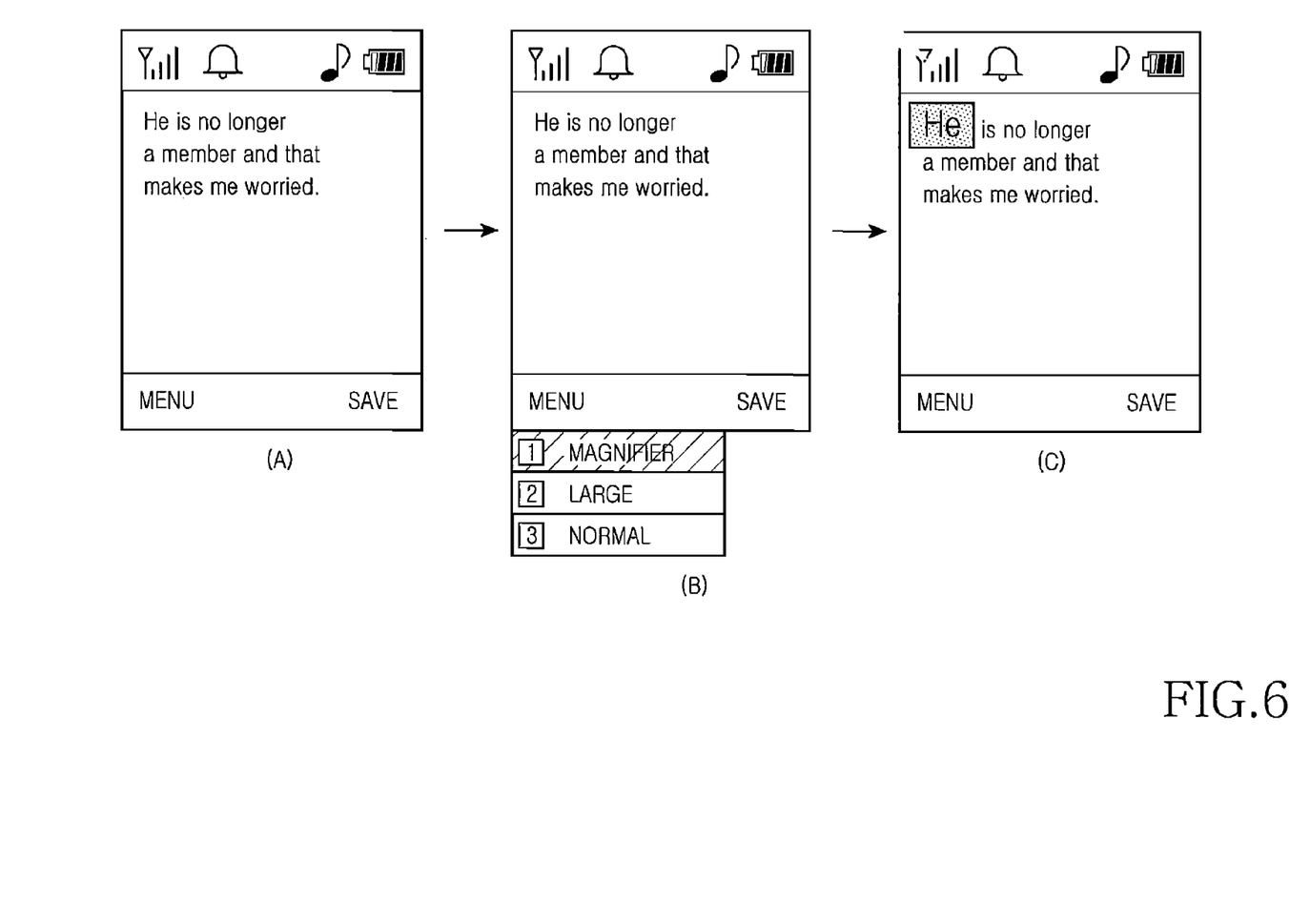
FIG. 6 is screen displays sequentially illustrating message reading in an increased font size according to the present invention.

FIG. 5 is screen displays sequentially illustrating message reading in a pop-up window and FIG. 6 is screen displays sequentially illustrating message reading in a magnifier window.

Referring to FIG. 5, upon user-selection of a message, it is displayed on the display 110, as illustrated in screen (A) of FIG. 5. When the user selects a menu item "large view", part of the message to be zoomed in is selected (e.g. the firs line: "He is no longer"), as illustrated in screen (B) of FIG. 5. As illustrated in screen (C) of FIG. 5, a pop-up window is invoked and the selected part is enlarged on the display. Preferably, the menu item "large view" is used to enlarge a message on a line-by-line basis. When the user scrolls from the selected line by a directional key (▲/▼/◄/►), the next line or the previous line is enlarged, for reading.

Referring to FIG. 6, upon user-selection of a message, it is displayed on the display 110, as illustrated in screen (A) of FIG. 6. When the user selects a menu item "magnifier", as illustrated in screen (B) of FIG. 6, the message is preferably magnified on a word-by-word basis, as illustrated in screen (C) of FIG. 6. The user can read the message continuously by the magnifier using the directional keys (▲/▼/◄/►). The menu item "magnifier" is used to magnify a selected word or sentence through a magnifier window in a message displayed on the display 110.

As described above, the present invention improves readability of a message by enlarging characters of a predetermined size in a pop-up window or a magnifier window, while complying with an existing message entry rule for emoticons in a mobile communication system.

Also, a method of changing a font size of a message in a mobile communication system may comprises the steps of selecting a font size change menu, displaying a font size changing window and entering a message with a changed font size in the font size changing window.

Also, a method of changing a font size of a message in a mobile communication system may comprise the steps of monitoring selection of a font size change menu during writing a message and displaying a font size changing window, if the font size change menu is selected and entering a message with a changed font size in the font size changing window.

Also, a method of changing a font size of a message in a mobile communication system may comprise the steps of selecting a font size change menu during reading a message, selecting a part of the message to be changed in a font size and changing the font size of the selected message part in a window. Here, the window may change the message on one of a word-by-word basis and a sentence-by-sentence basis.

Also, a method of changing a font size of a message in a mobile communication system may comprise the steps of monitoring selection of a font size change menu during message reading, selecting a part of the message, if the font size change menu is selected, and changing the font size of the selected message part.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method performed by an electronic device, comprising:
   providing, via a display screen, a first user interface to receive a first user input and to display user inputted content including a first representation of the first user input;
   receiving an instruction to provide a second user interface;
   providing, via the display screen, the second user interface together with the first user interface in response to the received instruction, a portion of the user inputted content being displayable in the second user interface in an enlarged size;
   receiving, via the second user interface, a second user input;
   in response to the second user input, displaying a second representation of the second user input in the second user interface; and
   updating the user inputted content displayed in the first user interface by adding the second representation in a displayed size smaller than a size used for displaying the second representation in the second user interface.

2. The method of claim 1, wherein, after the user inputted content is updated in the first user interface, the second representation displayed in the second user interface is concurrently displayed in the first user interface in the smaller displayed size.

3. The method of claim 1, wherein a portion of the user inputted content displayed in the first user interface selected for enlarged viewing via the second user interface can be changed using a directional key.

4. The method of claim 1, wherein receiving the instruction comprises:
   receiving a selection of a menu as at least a part of the instruction.

5. The method of claim 1, wherein providing the second user interface together with the first user interface comprises:
   displaying, via the second user interface, the portion of the user inputted content as enlarged compared to an original size of the portion.

6. The method of claim 1, wherein the first user input comprises text.

7. The method of claim 1, wherein at least part of the user inputted content is entered in the first area as a user input prior to receiving the instruction.

8. An apparatus comprising:
a display; and
a processor configured to:
provide, via a display screen of the display, a first user interface to receive a first user input and to display user inputted content including a first representation of the first user input;
receive an instruction to provide a second user interface;
provide, via the display screen of the display, the second user interface together with the first user interface in response to received instruction, a portion of the user inputted content being displayable in the second user interface in an enlarged size;
receive, via the second user interface, a second user input;
in response to the second user input, display a second representation of the second user input in the second user interface; and
update the user inputted content displayed in the first user interface by adding the second representation in a displayed size smaller than a size used for displaying the second representation in the second user interface.

9. The apparatus of claim 8, wherein, the processor is further configured to:
concurrently display the second representation displayed in the second user interface in the first user interface in the smaller displayed size after the user inputted content is updated in the first user interface.

10. The apparatus of claim 8, wherein the processor is further configured to:
change a portion of the user inputted content displayed in the first user interface selected for enlarged viewing via the second user interface using a directional key.

11. The apparatus of claim 8, wherein the processor is further configured to:
display, via the second user interface, the portion of the user inputted content as enlarged compared to an original size of the portion.

12. The apparatus of claim 8, wherein the processor is further configured to:
display at least part of the first representation in a first area in relation with the user inputted content.

13. The apparatus of claim 8, wherein at least part of the user inputted content is entered in a first area as a user input prior to receiving the instruction.

14. The apparatus of claim 8, wherein the processor is further configured to:
change a size of the first representation from a first size to a second size.

15. An apparatus comprising:
a display; and
a processor configured to:
display content in a first area of the display;
receive an instruction to display an input interface;
provide the input interface in a second area of the display in response to the received instruction;
receive, via the input interface, input;
in response to the input, display, via the input interface, a first representation corresponding to the input in a first size larger than a second size used for displaying the content; and
display a second representation corresponding to at least a portion of the first representation in the first area in relation to the content.

16. The apparatus of claim 15, wherein the processor is further configured to:
display, via the input interface, at least one portion of the content as enlarged compared to an original size of the at least one portion of the content.

17. The apparatus of claim 15, wherein at least part of the content is entered in the first area as user input prior to receiving the instruction.

18. The apparatus of claim 15, wherein at least one portion of the content to be displayed via the input interface can be changed using a directional key.

19. The apparatus of claim 15, wherein the processor is further configured to:
provide a magnifier interface in a third area of the display in response to a user input; and
display, via the magnifier interface, at least one portion of the content in a third size larger than the second size.

20. The apparatus of claim 19, wherein the processor is further configured to:
move the magnifier interface in response to another user input, wherein moving the magnifier interface comprises displaying, via the magnifier interface, another portion of the content in the third size larger than that of a corresponding portion of the content in the first area.

* * * * *